United States Patent
Choi et al.

(10) Patent No.: US 9,045,897 B2
(45) Date of Patent: Jun. 2, 2015

(54) INFRARED RAY BLOCKING MULTI-LAYERED STRUCTURE INSULATING FILM HAVING THERMAL ANISOTROPY

(71) Applicant: Korea Institute of Industrial Technology, Chungcheongnam-do (KR)

(72) Inventors: Kyung Ho Choi, Hwaseong-si (KR); Sangkug Lee, Yongin-si (KR); Gyo Jic Shin, Hwaseong-si (KR)

(73) Assignee: Korea Institute of Industrial Technology, Chungcheongnam-do (KR)

( * ) Notice: Subject to any disclaimer, the term of this patent is extended or adjusted under 35 U.S.C. 154(b) by 53 days.

(21) Appl. No.: 13/849,916

(22) Filed: Mar. 25, 2013

(65) Prior Publication Data
US 2013/0251981 A1 Sep. 26, 2013

(30) Foreign Application Priority Data

| | | |
|---|---|---|
| Mar. 23, 2012 | (KR) | 10-2012-0029880 |
| Mar. 23, 2012 | (KR) | 10-2012-0029884 |
| May 25, 2012 | (KR) | 10-2012-0056081 |
| Mar. 12, 2013 | (KR) | 10-2013-0026325 |
| Mar. 12, 2013 | (KR) | 10-2013-0026328 |

(51) Int. Cl.
| | |
|---|---|
| B32B 5/16 | (2006.01) |
| B32B 27/40 | (2006.01) |
| B32B 9/04 | (2006.01) |
| B32B 27/32 | (2006.01) |
| E04B 1/78 | (2006.01) |
| G02B 5/20 | (2006.01) |
| G02B 5/22 | (2006.01) |

(52) U.S. Cl.
CPC . *E04B 1/78* (2013.01); *G02B 5/208* (2013.01); *G02B 5/22* (2013.01)

(58) Field of Classification Search
None
See application file for complete search history.

(56) References Cited

U.S. PATENT DOCUMENTS

| | | | |
|---|---|---|---|
| 2007/0092730 A1* | 4/2007 | Inakura et al. | 428/411.1 |
| 2009/0232552 A1 | 9/2009 | Mitsumori et al. | |

FOREIGN PATENT DOCUMENTS

| | | |
|---|---|---|
| JP | 2007-500661 A | 1/2007 |
| JP | 2012-072402 A | 4/2012 |
| JP | 2012-203083 A | 10/2012 |
| KR | 10-2006-0024328 A | 3/2006 |
| KR | 10-2007-0059582 A | 6/2007 |
| KR | 10-0990168 B1 | 10/2010 |
| KR | 10-1013123 B1 | 2/2011 |
| KR | 2010-0031004 A | 3/2011 |
| KR | 10-2011-0084849 A | 7/2011 |
| KR | 10-1141736 B1 | 5/2012 |

OTHER PUBLICATIONS

Office Action dated Mar. 24, 2014 in Korean Application No. 10-2013-0026325.
Office Action dated Mar. 27, 2014 in Korean Application No. 10-2013-0026328.
Office Action dated Jan. 17, 2014 in Korean Application No. 10-2012-0029884.
Office Action dated Feb. 19, 2014 in Korean Application No. 10-2012-0029880.
Office Action dated Aug. 28, 2013 in Korean Application No. 10-2012-0029880, filed Mar. 23, 2012.
Office Action dated Nov. 26, 2013 in Korean Application No. 10-2012-0056081.

* cited by examiner

*Primary Examiner* — Sheeba Ahmed
(74) *Attorney, Agent, or Firm* — Saliwanchik, Lloyd & Eisenschenk

(57) ABSTRACT

The present invention relates to an infrared blocking multi-layered insulating film having thermal anisotropy, the film comprising an infrared absorption layer comprising at least one of perovskite oxide dispersed sol, metallic oxide dispersed sol, and ITO or ATO; a thermal resistance layer located on or above one surface of the infrared absorption layer; and an emission layer located on or above another surface of the infrared absorption layer. An infrared blocking multi-layered insulating film having thermal anisotropy according to the present invention may control heat flow, thereby generating excellent insulating effect.

18 Claims, 1 Drawing Sheet

INFRARED RAY BLOCKING MULTI-LAYERED STRUCTURE INSULATING FILM HAVING THERMAL ANISOTROPY

CROSS-REFERENCE TO RELATED APPLICATIONS

This application claims the benefit under 35 U.S.C. §119 of Korean Patent Application Nos. 10-2012-0029880, filed Mar. 23, 2012; 10-2012-0029884, filed Mar. 23, 2012; 10-2012-0056081, filed May 25, 2012; 10-2013-0026325, filed Mar. 12, 2013; and 10-2013-0026328, filed Mar. 12, 2013, which are hereby incorporated by reference in their entirety.

BACKGROUND

1. Field of the Invention

The following description relates to an infrared ray blocking multi-layered structure insulating film having thermal anisotropy, and more particularly, to a multi-layered structure insulating film which has an infrared absorption layer, thermal resistance layer and emission layer, the infrared absorption layer having excellent effect in absorbing infrared ray, thereby adjusting a degree of thermal energy reemitted in the infrared absorption layer by the infrared absorption layer and emission layer, so as to maximize an infrared blocking effect.

2. Description of Related Art

Developing new renewable energy and alternative energy is emerging to reduce emission of green house gases and develop alternative technologies due to depletion of fossil energy, together with increased interest in creating added value through efficient management of energy technologies.

Accordingly, there is constant need for functional materials capable of blocking infrared ray in buildings to increase efficiency of blocking heat while maintaining the same level of visible ray as that of existing glass to maintain a pleasant indoor environment in the summer time, and of minimizing indoor heat loss to efficiently manage heat in the winter time. Especially, demand on transparent thermal blocking material is expected to rise significantly.

The concept of infrared absorption material was first suggested in 1960s, but researches started in earnest in around 1998, and in 2000, the first product was put to market. And in around 2000, a first generation product line was created.

Attempts to control infrared ray as such were made using various technologies such as tinted glass, tinted film, sputter coating glass and sputter coating film etc. Some have already been commercialized, but there are still limits in performance and reliability to be resolved before supply. Especially, there are disadvantages in prior art, for example, sputtering coating glass is expensive in processing, easily oxidizes and the color easily changes; and tinted glass has low durability.

Thus, Europe which has long been interested in making alternatives to energy problems developed and used insulating windows and doors (low emission glass, low-E glass) filled with inert gas such as argon in the middle of dual layered sputter coating glass well known for its most excellent heat insulating characteristics, in around 1990 to early 2000s.

In addition, starting from Germany, followed by Austria, Switzerland, and Great Britain, institutional systems were made for metal coating type low emission glass, increasing demand on such glass. In addition, in Asian countries such as Japan and China, metal coating type low emission glass is in increasing use. However, in Korea, the application rate of metal coating type low emission glass is the lowest in the world due to lack of awareness in energy management technologies.

However, although it is possible to embody to a certain degree the performance characteristics such as high transmittance and infrared blocking characteristics of technologies of thin film metal coating, installation costs are high, and corrosion may occur in hot and humid environments, causing separation of film and change of color affecting reliability. Another problem is that it may interrupt transmission in mobile phones.

In addition, the increasing difference in heat expansion characteristics in a dual low emission glass product having high anisotropy due to absorption of infrared ray from outside may make a dual low emission glass which has been under constant stress to explode.

Furthermore, V-KOOL products of Southwall which use the technology of depositing thin metal films on the films have excellent infrared blocking rate of 96%, but the manufacturing process is very complicated and the price is expensive.

In addition, general heat insulating glass of prior art have low selective blocking effect for infrared ray, thereby making the inside darker.

That is, prior art development technologies of heat insulating glass and film cannot satisfy thermal resistance characteristics, economic feasibility, and durability at the same time, and thus there is a need to develop a technology which could apply a new concept different from prior art to resolve the aforementioned problems and be commercialized.

Therefore, the purpose of the present invention is to resolve the aforementioned problems of prior art, and more particularly, to configure an infrared absorption layer by combining materials effective in infrared blocking, thereby providing an infrared blocking multi-layered thermal insulating film having thermal anisotropy capable of effective infrared blocking.

Furthermore, the purpose of the present invention is to provide an infrared blocking multi-layered insulating film having thermal anisotropy which has an infrared absorption layer selectively blocking only infrared ray, an emission layer which emits the absorbed heat to outside, and a thermal resistance layer which reduces inflow of the absorbed heat to the inside, thereby effectively controlling thermal energy reemitted in the infrared absorption layer, so as to improve anisotropy characteristics of heat transfer and maximize the thermal insulation effect.

In addition, the purpose of the present invention is to provide an infrared blocking multi-layered insulating film having thermal anisotropy which not only has a low conductivity such that materials of an thermal resistance layer may be optimized so as to effectively control thermal energy reemitted in the infrared absorption layer, but which may also maintain a certain transmittance for visible ray.

BRIEF SUMMARY

According to an exemplary embodiment of the present disclosure for achieving the aforementioned purpose, there is provided an infrared blocking multi-layered insulating film having thermal anisotropy, the film comprising: an infrared absorption layer comprising at least one of perovskite oxide dispersed sol, metallic oxide dispersed sol, and ITO or ATO; a thermal resistance layer located on or above one surface of the infrared absorption layer; and an emission layer located on or above another surface of the infrared absorption layer. And the emission layer of the infrared blocking multi-layered structure insulating film having thermal anisotropy is characterized to be arranged in a heat source direction.

The perovskite oxide dispersed sol of the infrared ray absorption layer is characterized to comprise AxByOz dispersed sol, wherein A is Na, Cs or Li, and B is Mo or W, and a ratio of the x and y is 1:2.5 to 1:4, and a ratio of the y and z is 1:2.8 to 1:3.2, and more desirably, a ratio of the x, y, and z is 0.25:1:3 to 0.4:1:3.

The metallic oxide dispersed sol of the infrared absorption layer is characterized to comprise molybdenum dioxide dispersed sol.

The molybdenum dioxide dispersed sol is characterized to be composed to have ammonium molybdate as a precursor.

The perovskite oxide dispersed sol or the metallic oxide dispersed sol desirably comprises perovxkite oxide or metallic oxide, dispersion agent comprising acrylate block copolymer, and binder and organic solvent, and the perovskite oxide or the metallic oxide is 1.0 to 5.0 weight %, the dispersion agent is 1.0 to 5.0 weight %, the binder is 30 to 87 weight %, and the organic solvent is 10 to 60 weight %.

The binder may be photocurable resin compound comprising urethane acrylate, but is not limited thereto.

A dispersed particle size of the perovskite oxide dispersed sol or the metallic oxide dispersed sol is characterized to be 20 to 110 nm.

The thermal resistance layer desirably comprises at least one of nano pore formation material and nano clay.

The nano pore formation material may comprise two or more material having different thermal resistance, and a type of the material is not limited as long as the thermal resistances are different.

The thermal resistance layer desirably comprises polyimide and pore inducting polymer, wherein the pore inducing polymer is 5 to 20 part by weight regarding the polyimide 100 part by weight.

The pore inducing polymer may be at least one of polymethyl methacrylate, polyvinyl alcohol, and polyvinylpyrrolidone, but is not limited thereto.

A particle size of the pore inducing polymer is 0.05 μm to 3 μm, but is not limited thereto.

The thermal resistance layer may comprise both nano pore formation material and nano clay, the nano clay is characterized to be 1 to 5 part by weight regarding nano pore formation material 100 part by weight.

The nano pore formation material may comprise polyimide and pore inducing polymer, and a content ratio of the nano clay and the pore inducing polymer may be 1:2 to 1:4.

The emission layer may desirably comprise a carbon nano tube, but is not limited thereto.

There are one or more effects in an infrared blocking multi-layered structure insulating film having thermal anisotropy of the present invention as below.

An infrared absorption layer is formed to comprise at least one of materials capable of absorbing light of an infrared ray area, such as perovskite oxide dispersed sol, metallic oxide dispersed sol, ITO or ATO, and thus the excellent blocking performance regarding the infrared ray area and excellent transmittance regarding light of visible ray area make it possible to selectively absorb the infrared ray area. Accordingly, the present invention has excellent blocking effects regarding excellent infrared ray.

In addition, as an infrared absorption layer, emission layer, and thermal resistance layer are deposited and the emission layer is arranged in a heat source direction, the thermal resistance layer comprises nano pore formation material and nano clay to block thermal energy reemitted from the infrared absorption layer, and increases volume of emission of heat energy in the emission layer direction. As a result, heat energy emitted from the infrared absorption layer has thermal anisotropy, thereby reducing heat flow of the multi-layered film and maximizing insulating effects.

Not only that, material of the infrared absorption layer, emission layer, and thermal resistance layer are capable of maintaining a certain transmittance regarding the visible ray area.

The effects of the present invention are not limited to the aforementioned effects, and other effects not mentioned may be apparent to those skilled in the related art from the following detailed description, the drawings, and the claims.

DETAILED DESCRIPTION

Figure 1:
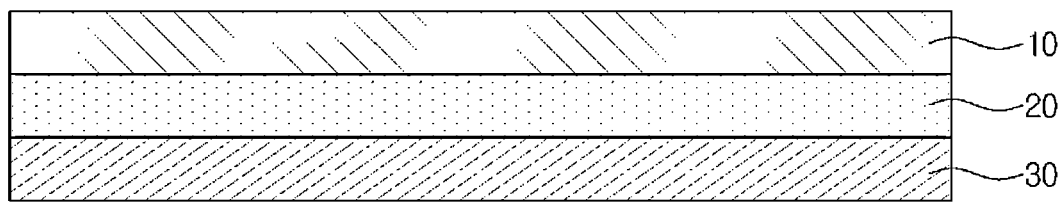
FIG. 1 is a cross-sectional view of an infrared blocking multi-layered insulating film according to an exemplary embodiment of the present invention.
Figure 2:
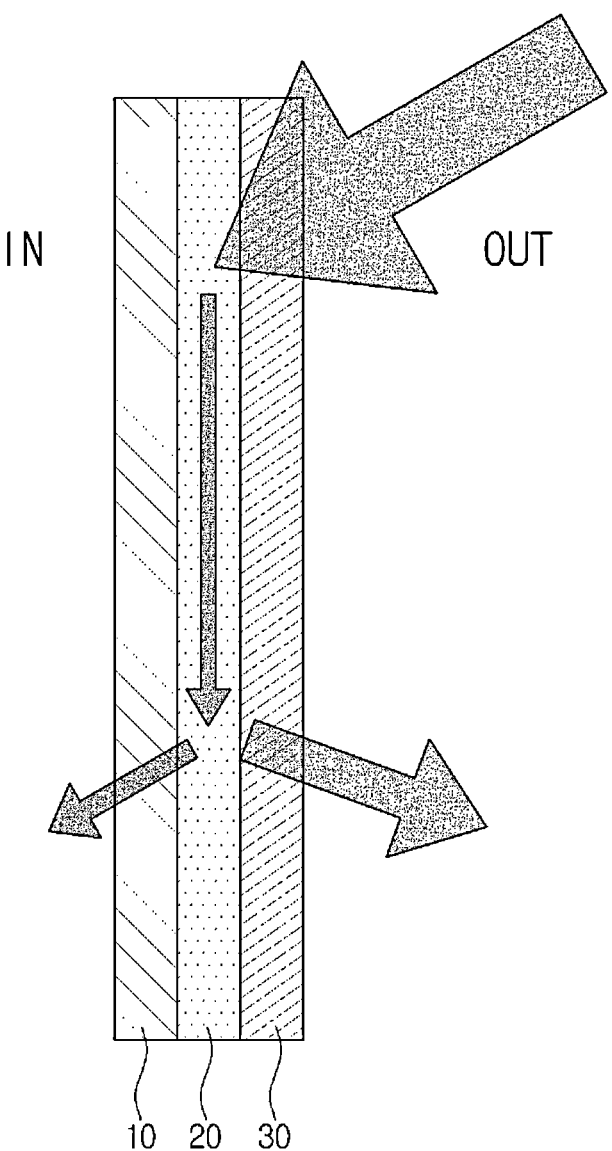
FIG. 2 is a mimetic view illustrating a flow of heat of an infrared blocking multi-layered insulating film according to an exemplary embodiment of the present invention. A size and thickness of an arrow is to mimetically illustrate a volume of infrared ray.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increase clarity and conciseness.

Spatially relative terms "below", "beneath", "lower", "above", and "upper" etc. may be used to easily disclose a correlative relationship between one configurative element with other configurative elements, as illustrated in the figures. The spatially relative terms should be understood as terms which include different directions of configurative elements in addition to directions illustrated in the figures when using or operating the present invention. For example, in a case of turning around a configurative element illustrated in the figures, the configurative elements which are illustrated to be located "below" or "beneath" of other configurative elements may also be "above" other configurative elements. Therefore, an exemplary term "below" may include both below and above directions. A configurative element may also be arranged in other directions, and accordingly, the spatially relative terms may be interpreted according to such arrangements.

Terms used in this specification is to explain exemplary embodiments of the present invention, and not to limit the present invention. In the present specification, unless specifically mentioned, a singular form includes a plural form as well. Terms "comprises" and/or "comprising" used in the present specification do not exclude existence or addition of a mentioned configurative element, and in the case of stages and/or operations, one or more configurative elements, and steps and/or operations.

Unless defined otherwise, all terms used in the present specification(including technical and scientific terms) should be understandable by those skilled in the technical field of the present invention. In addition, terms which are defined in generally used dictionaries should not be interpreted ideally or overly unless defined clearly and specifically.

The thickness or size of each configurative element in the figures have been exaggerated, omitted or roughly illustrated for the sake of convenience and clarity of explanation. Furthermore, the size or size area of each configurative element does not necessarily reflect an actual size or size area.

Hereinbelow is explanation on the present invention with reference to figures for explaining an infrared blocking multi-layered structure insulating film having thermal anisotropy according to exemplary embodiments of the present invention.

The present invention includes an infrared absorption layer 20, thermal resistance layer 10, and emission layer 30.

Infrared Absorption Layer 20

Nano dispersed transparent complexes which include various kinds of infrared absorption functional nano particles may be used as an infrared absorption layer of an infrared blocking multi-layered insulating film having thermal anisotropy of the present invention, and all materials which may be generally used in the related technical area may also be used without limitation.

As infrared absorption functional material, perovskite oxide dispersed sol, metallic oxide dispersed sol, and ITO or ATO etc. may be used, and in some cases, perovskite oxide dispersed sol, metallic oxide dispersed sol, and ITO or ATO may be used in combinations thereof.

Especially, it is desirable to include perovskite oxide dispersed sol or metallic oxide dispersed sol. Any perovskite oxide may be used as long as it has an infrared absorption function, but a desirable form is $A_xB_yO_z$ where A is Na, Cs or Li, and B is transition metal of Mo or W. A is an element which plays a role of a dopant, and B exists as oxide $B_oa$ where B is combined with oxygen.

Regarding a crystalline structure of this material, to lamellar material of $B_oa$ defined as transition metal oxide, adding materials corresponding to A are inserted into layers thereof, thereby transforming the existing stable crystalline structure. Thus, a new crystalline structure is formed which may cause unevenness of distance between elements, resulting in expressing a new electromagnetic characteristic against a stimulation of outside energy introduced. It is possible to adjust compositions and crystalline structures thereof such that an absorption energy level corresponds to an infrared area. Herein, a desirable ratio of x and y is 1:2.5 to 1:4, a desirable ratio of y and z is 1:2.8 to 1:3.2, and further, a more desirable ratio of x and y is 1:3.0 to 1:3.5, and a more desirable ratio of y and z is 1:2.9 to 1:3.1.

Since a mole ratio among A, B, and O elements significantly affect the screening effect of infrared ray, the present inventor conducted numerous times of experiments to discover an optimal mole ratio for a screening material. And thus, there is a problem that when less than or above the aforementioned range, the thermal resistance decreases significantly.

In addition, in the $A_xB_yO_z$, a desirable ratio of x, y and z is 0.25:1:3 to 0.4:1:3, and a more desirable ratio of x, y and z is 0.30:1:3 to 0.35:1:3. Furthermore, it is most desirable that $A_xB_yO_z$ includes $Cs_{0.33}W_1O_3$ or $Cs_{0.33}Mo_1O_3$. This is the mole ratio which maximizes the infrared screening effect, discovered as a result of numerous times of experiments.

In addition, the infrared absorption layer 20 of the present invention may include molybdenum dioxide dispersed sol.

In compounding molybdenum dioxide dispersed sol, molybdenum dioxide may be compounded having ammonium molybdate $((NH_4)_2MoO_4)$ as a precursor. Ammonium molybdate may be ground to have a particle size of 60 to 90 nm, thereby adjusting a size of molybdenum dioxide dispersed sol which may embody an optimal screening rate in an infrared ray area.

It is desirable that perovskite oxide or metallic oxide dispersed sol of the present invention further comprises a dispersion agent, binder and organic solvent besides perovskite oxide or metallic oxide.

The dispersion agent comprises an acrylate block copolymer having an acid value of a range of 15 to 25 mg KOH/g, and an amine value of 25 to 35 mg KOH/g. The solvent of the dispersion agent comprises methoxypropylacetate, butylglycol, and methoxypropanol. In order to disperse molybdenum dioxide effectively, it is desirable that the solvent has butylglycol 50 to 150 part by weight, and methoxypropanol 25 to 75 part by weight, regarding methoxypropylacetate 100 part by weight. The dispersion agent is desirably 80 to 120 part by weight, more desirably 90 to 110 part by weight, and most desirably 100 part by weight, regarding molybdenum dioxide 100 part by weight. When the dispersion agent is less than 80 part by weight, it is not possible to disperse molybdenum dioxide, and a degree of dispersion of the molybdenum dispersed sol decreases, and thus it becomes unable to block the infrared wavelength area as a coating material that the present invention intends to provide. When the dispersion agent is above 120 part by weight, coagulation of molybdenum particles intensifies, significantly lowering the penetration rate.

It is desirable that the binder is a photocurable binder. Any photocurable binder generally used in the related art may be used, but due to the nature of molybdenum dioxide, it is desirable to use urethane acrylate. Urethane acrylate is a general term for compounds having a urethane combination and acrylate group. It plays a role of a binder. Of among such urethane acrylates, direct additional type urethane acrylates or polyisocyanate direct additional type acrylates are desirable. A direct additional type urethane acrylate is a type where acrylic acid ester containing a hydroxyl group is added to an isocyanate compound, while a polyisocyanate direct additional type is a type where acrylate acid ester containing a hydroxyl group is directly added to a polyisocyanate compound such as isocyannulate.

One of methanol, ethanol, isopropyl alcohol, butanol, butandiol, methyl ethyl ketone, and dimethyl formamide, or two or more thereof may be used in combination as the organic solvent. It is desirable that alcohol solvents such as methanol, ethanol, isopropyl alcohol, butanol, and butandiol are used as the organic solvent, and it has been made clear through numerous times of experiments that the most effective solvent in dispersing molybdenum dioxide power is ethanol.

It is desirable that the perovskite oxide dispersed sol or metallic oxide dispersed sol comprises perovskite oxide or metallic oxide powder 1.0 to 5.0 weight %, dispersion agent 1.0 to 5.0 weight %, binder 30 to 87 weight %, and organic solvent 10 to 60 weight %, and more desirably, perovskite oxide or metallic oxide power 1.0 to 2.0 weight %, dispersion agent 1.0 to 2.0 weight %, binder 57 to 87 weight %, and organic solvent 10 to 40 weight %.

The smaller the contents of perovskite oxide or metallic oxide, the higher the transmittance of a visible ray area and of a infrared ray area, while the greater the contents of perovskite oxide or metallic oxide, the higher the screening rate of an infrared ray area but lower the transmittance of the visible ray area. Even a small difference of perovskite oxide or metallic oxide significantly affects the light transmittance, thereby controlling the contents and type of material such as dispersion agent, and it is possible to embody an insulating film having excellent effects under conditions of contents and types within the range of the present invention. In addition, the present inventor found out after a long term of research, that the most desirable insulating film may be embodied when molybdenum dioxide is 1.5 weight % regarding molybdenum dioxide dispersed sol compound 100 weight %, by appropriately adjusting the transmittance of the visible ray area and infrared ray area.

It is desirable that a dispersion particle side of the perovskite oxide or metallic oxide dispersed sol is 20 to 110 nm, more desirably 30 to 100 nm, in which case the visible ray transmittance rate is higher and thus effective. Herein, an average particle diameter of the perovskite oxide or metallic oxide dispersed sol compound refers to an average particle diameter of a format where perovskite oxide or metallic oxide has been dispersed and coagulated. And a dispersion particle size was measured by a particle size analyzer (PSA, OTSUKA Co. INC.,).

Using perovskite oxide or metallic oxide dispersed sol compound having 20 to 110 nm dispersion particle size as a coating film is for maintaining transparency of a visible ray area while also considering easy manufacturing. In a case where the dispersion particle size of the dispersed sol is smaller than 20 nm, it is difficult to completely screen light, and thus when the dispersion particle size of the dispersed sol is 20 nm or above, it is possible to maintain a recognition degree of the visible ray area while maintaining transparency with high efficiency. In a case where a dispersion particle size of the dispersed sol exceeds 110 nm, there is a problem that light scattering of a visible ray area of 400 nm to 780 nm increases due to geometric scattering or mie scattering, thereby deviating from Rayleigh Scattering. This is because, since in the Rayleight Scattering area, scattering light is reduced inversely proportional to six square of a diameter of a particle, when the dispersion particle size of the dispersed sol increases, the degree of dispersion increases, significantly decreasing the transparency. The dispersion particle size of the perovskite oxide or metallic oxide dispersed sol needs to be at least 80 to 100 nm considering commerciality, less than 80 nm for applying more excellent characteristics, and 30 to 50 nm for embodying excellent infrared screening effect while maximizing visible ray transmittance.

When using the perovskite oxide or metallic oxide dispersed sol compound as a film, the film may effectively block light of infrared ray area while transmitting sufficient amount of light of the visible ray area.

The perovskite oxide dispersed sol or metallic oxide dispersed sol is manufactured by compounding perovskite oxide or metallic oxide using a precursor, and then dispersing the compounded perovskite oxide or metallic oxide.

Detailed manufacturing method of a dispersed sol is as follows:

For example, $Cs_xMo_yO_z$ may be compounded with cesium carbonate($Cs_2CO_3$) solution and ammonium molybdate ($H_8MoN_2O_4$) as a precursor.

First of all, cesium carbonate($Cs_2CO_3$) solution and ammonium molybdate ($H_8MoN_2O_4$) solution are mixed to manufacture a mixed solution. This is a preparation process for compounding the thermal resistance material of the present invention in an optimal mole ratio. Herein, the cesium carbonate ($Cs_2CO_3$) solution is a mixture of cesium carbonate with water, while ammonium molybdate ($H_8MoN_2O_4$) solution is a mixture of ammonium molybdate with water. In the aforementioned mixing stage, for 1 mole of ammonium molybdate ($H_8MoN_2O_4$) solution, it is desirable to mix 0.25 to 0.4 mole of cesium carbonate ($Cs_2CO_3$) solution, and more desirably, 0.30 to 0.35 mole of cesium carbonate ($Cs_2CO_3$) solution. In a case where the cesium carbonate ($Cs_2CO_3$) solution is less than 0.25 mole or exceeds 0.4 mole, there is a problem that the mole ratio among elements of the compounded thermal resistance material goes beyond the optimal ration, significantly deteriorating the thermal resistance characteristics.

Thereafter, the mixture is dried and mixed powder is produced. This is a process of drying the mixed solution so that the next heating process could be performed effectively. Herein, it is desirable to dry the mixed solution for 5 to 10 hours at 100° C. to 300° C., more desirably for 7 to 9 hours at 150° C. to 200° C. However, at a temperature below 100° C., it is difficult to dry the mixed solution sufficiently enough, and the efficiency of the next heating process drops significantly, and at above 300° C., there is a problem that configurative material may be damaged.

Next, heating process is conducted where the mixed powder is heated and thermal resistance material is manufactured. This is a process of manufacturing thermal resistance material through a heating compounding process. The heating stage is characterized to include temperature rising, heating, and annealing.

First of all, the mixed power is heated up to 400° C. to 500° C. at a temperature rising speed of 20° C. to 40° C. This is a process of raising and heating the temperature at an optimal speed for effective heating of mixed powder. Herein, the desirable temperature rising speed is 20° C. to 40° C. per minute, and more desirably 25° C. to 30° C. per minute, and most desirably 27.5° C. In a case where the temperature rising speed is less than 20° C. or exceeds 40° C., there is a problem that economic feasibility decreases, and the thermal resistance material cannot be compounded uniformly.

Heating is conducted twice.

A first heating is a stage of heating the mixed powder for 40 to 80 minutes at 400° C. to 500° C. This is the first heating process of heating the mixed power while maintaining a certain temperature, so as to perform compounding. The desirable heating temperature is 400° C. to 500° C., and more desirably 430° C. to 470° C. When the heating temperature is less than 400° C., a compound ending reaction occurs, and when the heating temperature exceeds 500° C., there is difficulty in forming uniform thermal resistance material particles due to the fast compounding. At the temperature rising stage and first heating stage, it is desirable to input 70 to 110 cc of hydrogen per minute, and 5 to 20 cc of nitrogen per minute, and more desirably 85 to 95 cc of hydrogen per minute, and 8 to 12 cc of nitrogen per minute. This is for adjusting pressure and improving reactivity, so as to improve temperature rising and compounding reaction. Otherwise, the compounding reaction is interrupted, dropping the yield rate.

A second heating is a stage of heating the mixed powder for 5 to 20 minutes at 450° C. to 800° C. This is a second heating process where the compounding reaction is made in earnest. Herein, the desirable heating temperature is 450° C. to 800° C., more desirably 500° C. to 600° C., and the desirably heating time is 5 to 20 minutes, and more desirably 8 to 12 minutes. Otherwise, it is difficult to compound the thermal resistance material of the present invention.

The last stage is annealing the mixed powder for 10 to 80 minutes at 450° C. to 900° C. This is a process for maximizing selective blocking characteristics of a heat ray area of a thermal resistance material compounded by heating. Herein, the desirable annealing temperature is 450° C. to 900° C., more desirably 480° C. to 600° C., most desirably 500° C. At below 450° C., the thermal resistance characteristics of the thermal resistance material significantly deteriorates, and at above 900° C., the transparency of the thermal resistance material significantly deteriorates.

At the second heating and annealing stage, it is desirable to input 70 to 130 cc of nitrogen per minute, and more desirably 90 to 110 cc of nitrogen per minute. This is for adjusting pressure and improving reactivity, so as to improve temperature rising and compounding reaction. Otherwise, the compounding reaction is interrupted, dropping the yield rate, and deteriorating the performance.

As another example, molybdenum dioxide is compounded having ammonium molybdate as a precursor. Having ammonium molybdate as a precursor, when heating is performed, molybdenum dioxide may be compounded simply without any preprocessing.

Heating is performed in two stages: a first heating stage of heating the ammonium molybdate at 300 to 600° C., followed by a second heating stage of heat annealing at 500 to 700° C. to compound molybdenum dioxide. At the first heating stage, a reducing atmosphere is made where hydrogen gas flow is 50 to 120 cc/min, and nitrogen gas flow is 1 to 20 cc/min, and at the second heating stage, nitrogen gas flow is provided in 80 to 130 cc/min and annealed to compound molybdenum dioxide. More specifically, the molybdenum dioxide dispersed sol compound of the present invention includes molybdenum dioxide ($MoO_2$), dispersion agent, binder and organic solvent.

Compounding molybdenum dioxide is made with ammonium molybdate ($(NH_4)_2MoO_4$) as a precursor. Compounding molybdenum dioxide consists of grinding, first heating, and second heating and cooling.

First of all, ammonium molybdate which is the precursor is ground evenly such that a particle diameter of the ammonium molybdate is 60 to 90 nm, more desirably 65 to 80 nm. It is uneconomical when a particle diameter of ammonium molybdate is less than 60 nm, and it is difficult to adjust the particle size of the molybdenum dioxide dispersed sol compound manufactured thereafter and the visible ray transmittance rate may fall when the particle diameter exceeds 90 nm.

The first heating is a stage of inputting ammonium molybdenum powder ground at the grinding stage into a furnace and heating the powder. The desirable temperature at the first heating stage is 300 to 600° C., and more desirably 400 to 500° C. In order to transform the ammonium molybdate into ammonium molybdenum at the first heating stage, hydrogen gas and nitrogen is input into the furnace at the same time, and a reducing atmosphere is created where hydrogen gas flow is 50 to 120 cc/min, nitrogen gas flow is 10 to 120 cc/min. It is desirable that the first heating stage is conducted for 30 to 90 minutes, and more desirably 50 to 70 minutes. When the heating time of the first heating stage is less than 30 minutes, it is difficult to reduce ammonium molybdate, and thus it is not easy to generate molybdenum dioxide. This is also uneconomic when the heating time exceeds 90 minutes.

The second heating is a heating stage for heating annealing after the first heating. At the second heating stage, it is effective to increase the heating temperature to above that of the first heating stage to 500 to 700° C., and more desirably 530 to 600° C. At the second heating stage, unlike the first heating stage, nitrogen gas is input into the furnace, wherein the desirable nitrogen gas flow is 80 to 130 cc/min, more desirably 90 to 100 cc/min. Through the annealing heating of the second heating stage, compounding of ammonium molybdate to molybdenum dioxide is completed.

The cooling is a stage of slowly cooling the molybdenum dioxide powder compounded by the two stages of heating, where preparation for molybdenum dioxide for manufacturing a dispersed sol compound is completed.

Perovskite oxide or metallic oxide compounded as aforementioned is used to form the dispersed sol. A method of manufacturing the dispersed sol is explained hereinbelow by way of example of a method of manufacturing molybdenum dioxide dispersed sol.

Molybdenum dioxide dispersed sol is manufactured by mixing and dispersing the molybdenum powder compounded using the ammonium molybdate which is the precursor, dispersion agent and the organic solvent. The dispersing is performed in two stages: first dispersion and second dispersion.

Prior to conducting the dispersion, there is a stage for preparing a molybdenum dioxide mixture wherein the materials of the dispersed sol, that is, molybdenum, dispersion agent, and organic solvent are mixed.

The composition of the mixture is as explained hereinabove.

When a molybdenum mixture is prepared where molybdenum dioxide, dispersion agent and organic solvent are mixed, dispersion for manufacturing the dispersed sol compound is conducted.

The first dispersion is a stage of ball-mill dispersing the molybdenum mixture to obtain a first dispersed solution, and it is desirable to ball-mill disperse the molybdenum mixture with an ironball so that molybedenum oxide particles may be completely be wet with the dispersion agent.

The second dispersion is a stage of beadmill dispersing the first dispersed solution obtained from the first dispersion, and it is desirable to use zirconia bead as the beadmill. Zirconia has great corrosion resistance and high melting point and heat expansion rate, and especially similar characteristics as molybdenum dioxide, and thus is most suitable for manufacturing a molybdenum dioxide dispersed compound. A particle diameter of a zirconia bead is desirably 0.1 to 0.8 mm, and more desirably 0.2 to 0.5 mm. It is possible to conduct the first dispersion stage for 1 to 3 hours, and the second dispersion stage for 30 to 90 minutes, to obtain the molybdenum dioxide dispersed sol.

A dispersion particle size of the molybdenum dispersed sol obtained as aforementioned is adjusted to be between 20 to 110 nm, and desirably 65 to 80 nm.

After the dispersion stage, in order to use the molybdenum dioxide dispersed sol compound as a coating compound for film usage, the molybdenum dioxide dispersed sol compound is mixed with photocurable binder.

The perovskite oxide dispersed sol or metallic oxide dispersed sol may have different contents and reaction conditions depending on the material. Such perovskite oxide dispersed sol and metallic oxide dispersed sol have excellent infrared ray absorption characteristics.

Thermal Resistance Layer 10

The thermal resistance layer comprises material having low conductivity. The thermal resistance layer restricts discharging of thermal energy reemitted in the infrared absorption layer 20, and plays a role of significantly reducing transmittance of infrared ray while maintaining the transmittance the visible ray.

Thermal resistance layer 10 may include a dispersed film layer including clay in high molecular matrix material. Any material as long as it interrupts a heat transfer route by the dispersed clay may be used, but it is desirable to use nano pore formation material or nano clay.

The thermal resistance layer of the present invention may be a high molecular film layer including a pore structure, and may consist of two or more materials having different heat resistance, thereby forming pores.

A desirable format may include a pore inducing polymer called porogen, in the high molecular matrix material. The high molecular matrix material is desirably polyimide but is not limited thereto. That is, the high molecular matrix material may include polyimide and pore inducing polymer. This is to minimize reduction of property while significantly reducing thermal conductivity by effectively forming a port inside.

Polyamide acid which is a precursor forming polyimide is formed by mixing and reacting acid anhydride, diamine compound and organic solvent.

Herein, it is desirable that acid anhydride and diamine compound is an equivalence ratio, otherwise not only the property of polyamide acid but also the transparency decrease. In addition, it is desirable that the acid anhydride is at least one of Pyromelliticdianhydride, 4,4'-(Hexafluoroisopropylidene)diphthalicanhydride, 3,3,4,4-Benzophenontetracarboxyldianhydride, dimetylether -3,3',4,4'-Tetracarboxyldianhydride or 4,4'-Oxydiphtalicdianhydride, and more desirably using Pyromelliticdianhydride. This is thermal resistance material, so as to embody optical property and transparency.

In addition, it is desirable that the diamine compound is at least one of 4,4'-Oxydianilline, 4,4'-diaminodiphenylether or 2,6-Bis(3-aminophenoxy)penzonitryl, and more desirably, 4,4'-Oxydianilline. This is thermal resistance material, so as to embody optimal property and transparency.

It is desirable that the organic solvent is at least one of N-methyl-2-pyrrolidone, dimethlyacetamide, acetonitryl, t-butanole, acetone, dimethylformamide, isopropylalcohol or ethylacetate, and more desirably N-methyl-2-pyrrolidone. This is to optimize the compounding process of polyamide acid.

In addition, it is desirable that the pore inducing polymer is one of polymethyl methacrylate, polyvinyl alcohol or polyvinylpyrrolidone. This plays a role of effectively forming a pore within the thermal resistance material, thereby improving the thermal resistance characteristics. The pore inducing polymer effectively reacts within the polyimide, and distributes the pores evenly and in optimal sizes, thereby significantly improving the thermal resistance characteristics and minimizing reduction of property. In addition, it is desirable that the contents of the pore inducing polymer is 5 to 20 part by weight, regarding the polyimide 100 part by weight, and more desirably, 8 to 14 part by weight, and most desirably 10 part by weight. When less than 5 part by weight, there is small effect in improving thermal resistance characteristics, and when above 20 part by weight, not only the property of thermal resistance material but also the transparency are significantly reduced. It is desirable that a particle size of the pore inducing polymer is 0.05 μm to 3 μm, more desirably 0.5 μm to 1 μm. When less than 0.1 μm, it is difficult to manufacture and uneconomical, and there is small effect in improving thermal resistance characteristics, and when above 3 μm, transparency drops significantly, and thus not easy to use as transparent thermal resistance material. In addition, it is desirable that the molecular amount of the pore inducing polymer is 10,000 to 30,000, more desirably, 15,000 to 25,000, most desirably 20,000. When less than 10,000 or above 30,000, it is difficult to effectively form pores within polyimide.

The thermal resistance layer 10 of a desirable exemplary embodiment of the present invention may comprise a high molecular film layer comprising a pore structure and dispersion clay at the same time. That is, the thermal resistance layer 10 further comprises polyimide and clay in the pore inducing polymer. This is to improve the property by the clay, while significantly reducing the thermal conductivity by effectively forming a pore inside.

It is most desirable that the polyamide acid which is a precursor of polyimide is formed by mixing and reacting acid anhydride, diamine compound and organic solvent.

Herein, it is desirable that acid anhydride and diamine compound is equivalent ratio, otherwise, not only the property of polyamide acid but also the transparency decrease. In addition, it is desirable that the acid anhydride is at least one of Pyromelliticdianhydride, 4,4'-(Hexafluoroisopropylidene)diphthalicanhydride, 3,3,4,4-Benzophenontetracarboxyldianhydride, dimethylether-3,3',4,4'-Tetracarboxyldianhydride or 4,4'-Oxydiphtalicdianhydride, and more desirably Pyromelliticdianhydride. This is to embody optimal property and transparency as thermal resistance material.

In addition, it is desirable that the diamine compound is at least one of 4,4'-Oxydianilline, 4,4'-diaminodiphenylether and 2,6-Bis(3-aminophenoxy), and more desirably 4,4'-Oxydianilline. This is to embody optimal property and transparency as thermal resistance material.

It is desirable that the organic solvent is at least one of N-methyl-2-pyrrolidone, dimethylacetamide, acetonitrile, t-butanol, acetone, dimethylformamide, isopropylalcohol or ethyl acetate, and more desirably, N-methyl-2-pyrrolidone. This is to optimize the compounding process of polyamide acid.

In addition, the nano clay means clay, and is not limited to organic nano clay or inorganic nano clay.

It is possible to form a thermal resistance layer by combining nano pore formation material and nano clay, thereby more effectively reduce inflow of heat absorbed to the infrared blocking layer 20.

When nano pore formation material and nano clay are both included, it is desirably that the contents of the nano clay is 1 to 5 part by weight, more desirably 2 to 4 part by weight, most desirably 3 part by weight. When less than 1 part by weight, there is almost no heat blocking effect and improvement of mechanical property, and when above 5 part by weight, excessive viscosity makes it difficult to manufacture evenly distributed coating solution. In addition, it is desirable that the contents ratio of the nano clay and the pore inducing polymer is 1:2 to 1:4, more desirably 1:2.9 to 1:3.6, and most desirably 1:3.3. For example, when the nano clay is 1 g, excellent effect occurred when the pore inducing polymer is 2 g to 4 g. Otherwise, the inventor found out through numerous times of experiments that due to mutual reaction of the nano clay and the pore inducing polymer, property, transparency and thermal resistance cannot be improved effectively and in a balanced manner.

In addition, it is desirable that the pore inducing polymer is at least one of polymethyl methacrylate, polyvinyl alcohol and polyvinylpyrrolidone. This is to effectively form pores within the thermal resistance material, thereby improving thermal resistance characteristics such as thermal conductivity.

The pore inducing polymer effectively reacts within the polyamide acid, distributing pores in an even and optimal size, thereby minimizing reduction of property while significantly improving thermal resistance characteristics.

In addition, it is desirable that the contents of the pore inducing polymer is 2 to 20 part by weight regarding the polyamide 100 part by weight, more desirably 5 to 15 part by weight, and most desirably 10 part by weight regarding the polyamide 100 part by weight. When the pore inducing polymer is less than 2 part by weight, there is small effect of improving thermal resistance characteristics, and when the pore inducing polymer exceeds 20 part by weight, not only does the property of the thermal resistance material significantly but also the transparency decrease. It is desirable that a particle size of the pore inducing polymer is 0.1 μm to 3 μm, more desirably 0.5 μto 1 μm. When less than 0.1 μ, not only does the manufacturing process get difficult and uneconomical, but also the effect of improving the thermal resistance characteristics decrease, and when above 3 μm, the transparency decreases significantly, making it difficult to use as a transparent thermal resistance material. In addition, it is desirable that the molecular amount of the pore inducing polymer is 10,000 to 30,000, more desirably 15,000 to 25,000, and most desirably 20,000. When less than 10,000 or over 30,000, it is difficult to form pores within the polyamide effectively.

Hereinafter is explanation on manufacturing the thermal resistance layer 10. More particularly, forming nano pore formation material comprising polyamide and pore inducing polymer and a thermal resistance layer comprising nano clay.

First of all, a compound is made by mixing acid anhydride, diamine compound, and organic solvent. This is a preparation stage for compounding polyamide acid.

Acid anhydride, diamine compound, and organic solvent may be input in any order and mixed together.

In addition, it is desirable that the acid anhydride is at least one of Pyromelliticdianhydride, 4,4'-(Hexafluoroisopropylidene)diphthalicanhydride), 3,3,4,4-Benzophenontetracarboxyldianhydride, dimetylether-3,3',4,4'-,Tetracarboxyldianhydride or 4,4'-Oxydiphtalicdianhydride. And it is desirable that the diamine compound is at least one of 4,4'-Oxydianilline, 4,4'-diaminodiphenylether or 2,6-bis(3-aminophenoxy)benzonitryl, and it is desirable that the organic solvent is at least one of N-methyl-2-pyrrolidone, dimethylacetamide, acetonitryl, t-butanol, acetone, dimethylformamide, isopropryalcohol or ethyl acetate.

Next is a stage of manufacturing a polyamide acid by stirring and reacting the aforementioned compound. This is a process of compounding polyamide acid through the reaction.

Herein, it is desirable that regarding the compound inside the chamber the reaction temperature is maintained by adding heat from outside of a chamber or cooling the chamber, and although stirring may be made in any way, it is effective to use a stirring device and stir at a constant speed.

It is desirable that the reaction temperature is 10° C. to 50° C., more desirably 20° C. to 30° C. When less than 10° C., the compounding reaction is not made sufficiently, and when above 50° C., overreaction may lead to significant decrease of transparency and property of the thermal resistance material.

Furthermore, it is desirable that the reaction time is 8 hours to 15 hours, more desirably 10 hours to 12 hours. When less than 8 hours, the compounding reaction is not made sufficiently, and when the reaction is made over 15 hours, overreaction may reduce transparency and economical feasibility.

In addition, it is desirable that the viscosity of the polyamide acid solution is 80 CPS to 250 CPS, more desirably 120 CPS to 200 CPS, most desirably 140 CPS to 170 CPS. When the viscosity is less than 80 CPS or exceeds 250 CPS, the compounding reaction is not made effectively, which may lead to insufficient reaction with the pore inducing polymer in the next stage, that is the adding stage (S30), but also resulting in forming uneven pores.

Polyamide acid is a precursor of polyamide.

The last stage is a stage of adding pore inducing polymer and clay to the polyamide acid, to manufacture transparent thermal resistance material compound comprising clay. This is a process for dispersing clay and forming pores.

When pore inducing polymer is added to the compounded polyamide acid solution, and then stirred, the polyamide acid solution and pore inducing polymer react, forming thermal resistance material where pores are formed. The nano clay added is evenly distributed by this stirring.

Herein, the stirring may be made in any method, but it is effective to stir at a constant speed using a stirring device.

In addition, a desirable adding temperature is 30° C. to 80° C., more desirably 50° C. to 60° C. Otherwise, the pore formation reaction cannot be made effectively.

In addition, it is desirable to add the nano clay 1 to 5 part by weight and the pore inducing polymer 2 to 20 part by weight, regarding the polyamide acid solution 100 part by weight. And it is desirable that the pore inducing polymer is at least one of polymethyl methacrylate, polyvinyl alcohol, and polyvinylpyrrolidone.

In addition, it is desirable that the adding ratio of the nano clay and the pore inducing polymer is 1:2 to 1:4.

Emission Layer 30

An emission layer 30 is a layer comprising material having high heat emission rate.

Any material generally used in the related field may be included in the emission layer 30, desirably nano carbon group dispersed sol, and most desirably carbon nano tube dispersed sol which is effective in absorbing infrared ray and emitting reemitted heat outside.

The multi-layered film comprising the infrared absorption layer 20, thermal resistance layer 10 and emission layer 30 may maximize blocking infrared ray. Infrared ray brings excellent effects in blocking infrared ray due to the infrared absorption layer 20 having metallic oxide comprising molybdenum. In depositing the thermal resistance layer 10 and emission layer 30 on both surfaces of the infrared absorption layer 20, the emission layer 30 is arranged on the outside where there is heat source, and the thermal resistance layer 10 is arranged in the inside. Accordingly, thermal energy absorbed to the infrared absorption layer 20 is reemitted, increasing the emission rate towards the emission layer 30, generating thermal transfer phenomenon and anisotropy. Consequently, more heat is emitted outside, further maximizing the heat insulating characteristics. Herein, a certain transmission rate of visible ray is maintained.

That is, it is possible to further improve not only the infrared blocking effect due to the metallic oxide comprising molybdenum of the infrared absorption layer 20, but also improve the infrared blocking effect due to the structural characteristics of the multi-layered structure of the infrared absorption layer 20.

Hereinbelow is explanation on measuring a heat flow under different film structures. A heat flow was measured by a heat flow meter, and the temperature of the outside was maintained to be 50° C., with isothermal and isohumidity environment. Heat source existed inside.

Exemplary Embodiment 1

An insulating film was manufactured by depositing an emission layer comprising CNT dispersed sol, an infrared absorption layer comprising molybdenum dioxide, polyamide acid, and a thermal resistance layer 10 comprising pore inducing polymer and nano clay and PET equipment in the aforementioned order. The emission layer was arranged on the heat source side.

Comparative Embodiment 1

An insulating film was manufactured by depositing an infrared absorption layer comprising molybdenum dioxide, a thermal resistance layer comprising polyamide acid, pore inducing polymer and nano clay, and a PET equipment in the aforementioned order. The infrared absorption layer was arranged on the heat source side.

Comparative Embodiment 2

An insulating film was manufactured by depositing an emission layer comprising CNT dispersed sol, a thermal resistance layer comprising polyamide acid, pore inducing polymer and nano clay, and a PET equipment in the aforementioned order. The emission layer was arranged on the heat source side.

Comparative Embodiment 3

An insulating film was manufactured by depositing a thermal resistance layer comprising pore inducing polymer and nano clay, an infrared absorption layer comprising molybdenum dioxide, an emission layer comprising CNT dispersed sol and an PET equipment in the aforementioned order. The thermal resistance layer was arranged on the heat source side.

<Table 1> below shows heat flows of the aforementioned exemplary embodiment and comparative embodiments.

TABLE 1

|  | Exemplary embodiment 1 | Comparative embodiment 1 | Comparative embodiment 2 | Comparative embodiment 3 |
| --- | --- | --- | --- | --- |
| Heat flow (kcal/m²h) | 348 (at 46.9° C.) | 416 (at 48.1° C.) | 404 (at 48.9° C.) | 402.0 (at 47.9° C.) |

Comparative embodiment 1 does not have an emission layer in the multi-layered film of the present invention, comparative embodiment 2 does not have an infrared absorption layer in the multi-layered film of the present invention, and in comparative embodiment 3, the multi-layered film of the present invention is turned over. The lower the heat flow the greater the insulating effect. As shown in <Table 1>, in the case of exemplary embodiment 1, the heat flow is significantly reduced compared to comparative embodiments.

That is, the infrared blocking multi-layered insulating film having thermal anisotropy of the present invention has not only the effect of blocking infrared ray due to the infrared absorption layer, but also improves the anisotropy characteristics of heat transfer phenomenon by arranging an emission layer and thermal resistance layer on both surfaces of the infrared absorption layer to have directions. As a result, the infrared blocking effect is maximized, thereby embodying a film with excellent heat insulating effect.

Such an infrared blocking multi-layered insulating film may be attached to an arbitrary member which requires heat insulation. Especially, the infrared blocking multi-layered insulating film of the present invention has transparency, and thus is suitable for use in windows. It may be attached such that the emission layer is placed on the outside. It may also be used in dual, triple windows or windows having more layers. When the insulating film of the present invention is attached to a dual or further layered window, the insulating effect due to air layers between the windows will be added to the infrared blocking effect of the insulating film, thereby maximizing the insulating effect. When attaching the insulating film to a dual or further layered window, the insulating film may be attached to only one window or two or more windows. And when attaching the insulating film to two or more windows, it is desirable to attach the insulating film such that the emission layers of all insulating film face outside in order to maximize the thermal anisotropy.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. Infrared blocking multi-layered insulating film having thermal anisotropy, the film comprising:
    an infrared absorption layer comprising at least one of perovskite oxide dispersed sol, metallic oxide dispersed sol, and ITO or ATO;
    a thermal resistance layer located on or above one surface of the infrared absorption layer; and
    an emission layer located on or above another surface of the infrared absorption layer,
    wherein the thermal resistance layer comprises at least one of nano pore formation material or nano clay.

2. The infrared blocking multi-layered insulating film according to claim 1,
    wherein the emission layer is arranged in a heat source direction.

3. The infrared blocking multi-layered insulating film according to claim 1,
    wherein the perovskite oxide dispersed sol of the infrared ray absorption layer is AxByOz dispersed sol, A is Na, Cs or Li, and B is Mo or W.

4. The infrared blocking multi-layered insulating film according to claim 3, wherein a ratio of the x and y is 1:2.5 to 1:4, and a ratio of the y and z is 1:2.8 to 1:3.2.

5. The infrared blocking multi-layered insulating film according to claim 1, wherein the metallic oxide dispersed sol of the infrared absorption layer is molybdenum dioxide dispersed sol.

6. The infrared blocking multi-layered insulating film according to claim 1, wherein the molybdenum dioxide dispersed sol is composed having ammonium molybdate as a precursor.

7. The infrared blocking multi-layered insulating film according to claim 1, wherein the perovskite oxide dispersed sol or the metallic oxide dispersed sol comprises perovxkite oxide or metallic oxide, dispersion agent comprising acrylate block copolymer, and binder and organic solvent.

8. The infrared blocking multi-layered insulating film according to claim 7, wherein the perovskite oxide or the metallic oxide is 1.0 to 5.0 weight %, the dispersion agent is 1.0 to 5.0 weight %, the binder is 30 to 87 weight %, and the organic solvent is 10 to 60 weight %.

9. The infrared blocking multi-layered insulating film according to claim 7, wherein the binder is photocurable resin compound comprising urethane acrylate.

10. The infrared blocking multi-layered insulating film according to claim 1,
    wherein a dispersed particle size of the perovskite oxide dispersed sol or the metallic oxide dispersed sol is 20 to 110 nm.

11. The infrared blocking multi-layered insulating film according to claim 1, wherein the nano pore formation material comprises two or more materials having different thermal resistance.

12. The infrared blocking multi-layered insulating film according to claim 1,
    wherein the nano pore formation material comprises polyimide and pore inducing polymer.

13. The infrared blocking multi-layered insulating film according to claim 3, wherein the pore inducing polymer is at least one of polymethyl methacrylate, polyvinyl alcohol, and polyvinylpyrrolidone.

14. The infrared blocking multi-layered insulating film according to claim 12, wherein a particle size of the pore inducing polymer is 0.05 μm to 3 μm.

15. The infrared blocking multi-layered insulating film according to claim 1, wherein in a case where the thermal resistance layer comprises nano pore formation material and nano clay, the nano clay is 1 to 5parts by weight to 100 parts by weight of the nano pore formation material.

16. The infrared blocking multi-layered insulating film according to claim 15, wherein the nano pore formation material comprises polyimide and pore inducing polymer.

17. The infrared blocking multi-layered insulating film according to claim 16, wherein a content ratio of the nano clay and the pore inducing polymer is 1:2 to 1:4.

18. The infrared blocking multi-layered insulating film according to claim 1, wherein the emission layer comprises a carbon nano tube.

* * * * *